United States Patent
Dommel et al.

(10) Patent No.: US 12,301,277 B2
(45) Date of Patent: *May 13, 2025

(54) PARAMETER BASED ADAPTION OF A TRANSMISSION SCHEME ON A RADIO RESOURCE

(71) Applicant: Fraunhofer-Gesellschaft zur Foerderung der angewandten Forschung e.V., Munich (DE)

(72) Inventors: Johannes Dommel, Berlin (DE); Zoran Utkovski, Berlin (DE); Thomas Haustein, Berlin (DE); Michel Massanet-Ginard, Berlin (DE); Dennis Wieruch, Berlin (DE); Lars Thiele, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,709

(22) Filed: Nov. 16, 2023

(65) Prior Publication Data

US 2024/0275427 A1    Aug. 15, 2024

Related U.S. Application Data

(63) Continuation of application No. 17/975,464, filed on Oct. 27, 2022, now Pat. No. 11,855,684, which is a
(Continued)

(30) Foreign Application Priority Data

Apr. 30, 2020    (EP) .................................... 20172436

(51) Int. Cl.
H04L 1/04    (2006.01)
H04B 1/713    (2011.01)
H04L 1/08    (2006.01)

(52) U.S. Cl.
CPC ............... H04B 1/713 (2013.01); H04L 1/04 (2013.01); H04L 1/08 (2013.01)

(58) Field of Classification Search
CPC .............. H04B 1/713; H04L 1/04; H04L 1/08
(Continued)

(56) References Cited

U.S. PATENT DOCUMENTS 11,528,069 B2 *    12/2022   Lee ....................... H04B 7/0626
11,646,838 B2 *    5/2023    Pezeshki ............... H04L 5/0048
                                                                       370/329

(Continued)

FOREIGN PATENT DOCUMENTS

EP    2806596 A1    11/2014
KR    100695048 B1    3/2007
WO    2002/49305 A2    6/2002

OTHER PUBLICATIONS

3GPP TSG RAN #86, "Moderator summary of Rel-17 NB-IoT and LTE-MTC enhancements Phase 2 discussion", RP-192877, Dec. 2019.

(Continued)

Primary Examiner — Hirdepal Singh
(74) Attorney, Agent, or Firm — Perkins Coie LLP; Michael A. Glenn

(57) ABSTRACT

A user device, UE, and a base station, BS, for a wireless communication system is described. Each is using a transmission scheme on a radio resource, and is to determine one or more parameters of a radio channel associated with the radio resource, and to adapt the transmission scheme by selecting an additional radio resource on the basis of the
(Continued)

determined one or more parameters. Further a wireless communication system, comprising two or more of the above devices, corresponding methods and a computer program product are described.

16 Claims, 13 Drawing Sheets

Related U.S. Application Data continuation of application No. PCT/EP2021/061319, filed on Apr. 29, 2021.

(58) Field of Classification Search
USPC .......................................................... 375/262
See application file for complete search history.

(56) References Cited

U.S. PATENT DOCUMENTS

| | | | |
|---|---|---|---|
| 11,991,700 B2* | 5/2024 | Matsumura | H04B 1/713 |
| 2010/0008440 A1 | 1/2010 | Lin et al. | |
| 2010/0296547 A1* | 11/2010 | Skillermark | H04L 5/0012 |
| | | | 375/132 |
| 2014/0086152 A1 | 3/2014 | Bontu et al. | |
| 2015/0271788 A1 | 9/2015 | Kim et al. | |
| 2015/0280876 A1* | 10/2015 | You | H04L 27/2613 |
| | | | 370/329 |
| 2020/0059821 A1 | 2/2020 | Wirth et al. | |
| 2021/0136731 A1* | 5/2021 | Li | H04W 28/0278 |
| 2022/0140926 A1 | 5/2022 | Gulati et al. | |
| 2023/0085606 A1* | 3/2023 | Shao | H04L 5/0012 |
| | | | 370/329 |

OTHER PUBLICATIONS

Düngen, Monique, et al., "Channel measurement campaigns for wireless industrial automation", Automatisierungstechnik 67, pp. 7-28.

Mattisson, Sven, "Overview of 5G requirements and future wireless networks", ESSCIRC 2017—43rd IEEE European Solid State Circuits Conference, pp. 1-6.

* cited by examiner

PARAMETER BASED ADAPTION OF A TRANSMISSION SCHEME ON A RADIO RESOURCE

CROSS-REFERENCE TO RELATED APPLICATIONS

This application is a continuation of U.S. patent application Ser. No. 17/975,464 filed Oct. 27, 2022, which is a continuation of International Application No. PCT/EP2021/061319, filed Apr. 29, 2021, which is incorporated herein by reference in its entirety, and additionally claims priority from European Application No 20172436.6, filed Apr. 30, 2020, which is also incorporated herein by reference in its entirety.

The present application concerns the field of wireless communication systems or networks, more specifically a communication between a user device or user equipment, UE, and a base station or between user devices or base stations, which can be part of a communication network. Embodiments concern approaches allowing to improve transmission quality by adapting the transmission scheme. In particular regarding narrowband IoT, Internet of Things, communication for simple sensors transmitting data over large distances and other ultra-reliable, UR, communication where data and control packets are duplicated or complementing each other and mapped onto radio resources which are independent with regard to channel quality degradation effects and events. For the communication a set of time-frequency resources is selected and allocated by a scheduling entity or alternatively randomly or deterministically but a priori known the time-frequency resources inside a given frequency band.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, ... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device (D2D) communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and one or more of a system information block (SIB), the physical downlink, uplink and sidelink control channels (PDCCH, PUCCH, PSSCH) carrying for example the downlink control information (DCI), the uplink control information (UCI) and the sidelink control information (SCI). Note, the sidelink interface may a support 2-stage SCI. This refers to a first control region containing some parts of the SCI, and optionally, a second control region, which contains a second part of control information.

For the uplink, the physical channels may further include the physical random-access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations. In addition to the above described terrestrial wireless network also non-terrestrial wireless communication networks (NTN) exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g. GSM, UMTS, LTE base stations.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present.

Although FIG. 2 and FIG. 3 illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

A wireless communication system, such as for example a 5G system, as described above with reference to FIG. 1, FIG. 2 or FIG. 3, is expected to provide, among many key performance indicators, KPI, for any communication, uplink, downlink or sidelink, high reliability, low latency, high data rates and coverage extension features. Deficient wireless channels, for example, caused by a lack of channel variation, may lead to long outage periods. The received power can thus be degraded by the deficiency of the wireless propagation channel due to the lack of diversity usually provided by additional antennas at either side of the communication link.

It is noted that the information in the above section is only for enhancing the understanding of the background of the invention and therefore it may contain information that does not form conventional technology that is already known to a person of ordinary skill in the art.

SUMMARY

An embodiment may have a user device, UE, for a wireless communication system, using a transmission scheme on a radio resource, wherein the user device is to determine one or more parameters of a radio channel associated with the radio resource, and to adapt the transmission scheme by selecting an additional radio resource on the basis of the determined one or more parameters.

Another embodiment may have a base station, BS, for a wireless communication system, using a transmission scheme on a radio resource, wherein the base station is to determine one or more parameters of a radio channel associated with the radio resource, and to adapt the transmission scheme by selecting an additional radio resource on the basis of the determined one or more parameters.

According to another embodiment, a wireless communication system may have: two or more inventive devices.

According to another embodiment, a method of operating a user device, UE, for a wireless communication system, using a transmission scheme on a radio resource, may have the step of: determining one or more parameters of a radio channel associated with the radio resource, and adapting the transmission scheme by selecting an additional radio resource on the basis of the determined one or more parameters.

According to another embodiment, a method of operating a base station, BS, for a wireless communication system, using a transmission scheme on a radio resource, may have the step of: determining one or more parameters of a radio channel associated with the radio resource, and adapting the transmission scheme by selecting an additional radio resource on the basis of the determined one or more parameters.

Another embodiment may have a non-transitory digital storage medium having a computer program stored thereon to perform the any of the inventive methods when said computer program is run by a computer.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
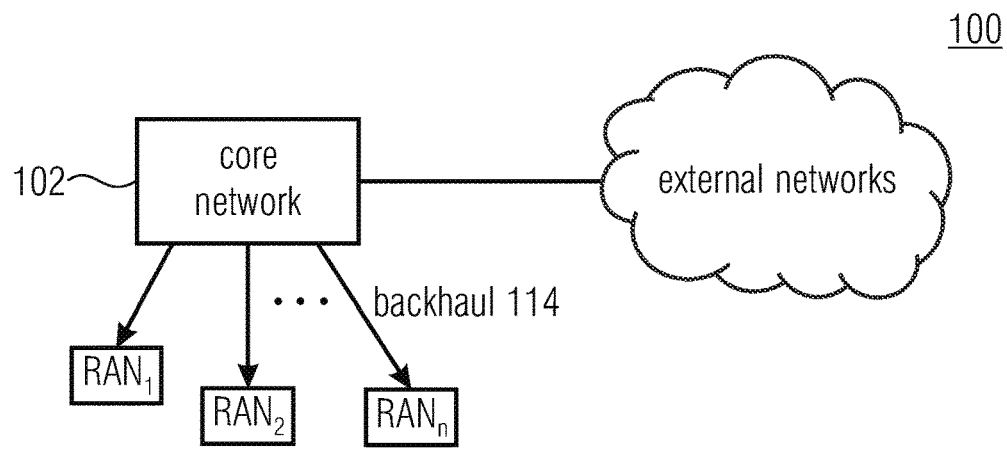
FIG. 1a-b shows a schematic representation of an example of a wireless communication system.

Embodiments of the present invention are now described in more detail with reference to the accompanying drawings in which the same or similar elements have the same reference signs assigned.

In a wireless communication system or network as described above with regard to FIG. 1, FIG. 2 or FIG. 3, where small data packets are transmitted between mobile terminals (e.g. sensor-nodes equipped with a wireless modem) and wireless access points (e.g. gNB). An example for such a system is 5G systems. For the communication, both directions, i.e. uplink and downlink are equally considered in the following. Sideline communication can also be affected. For the both directions of information flow, the following is exemplary the case for some communication systems: information from a mobile terminal to a base station (uplink (UL), e.g. sensor-data) and, for the other direction from a base station to a mobile terminal (downlink (DL), e.g. control information). As mentioned before communication can also take place between two base stations and/or two mobile terminals. Such communication can equally be affected.

As an example, without restricting above detailed cases, when a mobile terminal has data to transmit, it initiates a random-access procedure before starting the transmission. In both link directions, the mobile terminal is allocated with a set of time-frequency resources selected and allocated by a scheduling entity or alternatively randomly or deterministically but a priori known the time-frequency resources inside the given frequency band. The scheduling information block, SIB, is included on the broadcast channel and periodically transmitted by the base station with information concerning all mobile terminals. The resource allocation and link adaptation fields are stated in the downlink control channel, DCI, transmitted also by the base station. Link adaptation of the mobile terminals is based on the channel estimation performed at the scheduled frequency resources. These measurements are conducted in UL and DL, for example using reference symbols, RS, that can be multiplexed with the traffic data and/or control information.

In the DL channel estimation process, the mobile terminal measures the channel and reports it to the base station through a feedback mechanism. In the UL channel estimation process, the base station directly estimates the channel by means of the terminal's transmitted RS. According to the measured channel quality, the base station adapts the modulation and coding schemes for every device. In some technologies where high data rates are not pursued, like NB-IoT for example, the adaptation of the modulation has lower impact. As an example, NB-IoT (Narrowband Internet-of-Things) presents only Quadrature Phase Shift Keying (QPSK) in DL and Binary Phase Shift Keying (BPSK) and QPSK in UL. In such cases, other transmission parameters are adapted such as the number of repetition times ($N_{rep}$) that the data packet is transmitted in order to improve the radio link in difficult propagation conditions. Retransmission of messages using the same frequency resource at multiple time instances beyond the coherence time is very effective in time varying channels e.g. when mobility is involved. In a static scenario with a fixed or constant narrowband allocation of frequency resources retransmitted packets are likely to experience the same channel conditions even when transmitted after long time intervals.

As a consequence, current 5G systems have the problem that they are expected to provide among many KPIs high reliability, low latency, high data rates and coverage extension features. Optimized link adaptation and scheduling algorithms are not enough to meet the requirements of the coming 5G applications. In addition, some radio propagation scenarios experience deficient wireless channels. For example, when deep fading events caused by multipath propagation occur in scenarios with static mobile terminals, the lack of channel variation may lead to long outage periods (e.g. sensors embedded on machinery on an industrial plant). These propagation conditions are similar to the ones experienced by mobile terminals moving with a given velocity and being affected by large scale fading (e.g. shadowing) especially when few multi-path components (MPC) are present (e.g. cars transmitting to the base station at the mm-Wave spectrum and suffering from blockage). In such cases, the received power is degraded by the deficiency of the wireless propagation channel due to the lack of diversity usually provided by additional antennas at either side of the communication link.

Thus, enhancements in conventional approaches are associated to the achievement of channel diversity. Enabling channel diversity (e.g. in time, frequency or space) is one solution to face deficient propagation conditions. Also, the use of frequency diversity was proposed as a possible link enhancement for NB-IoT. The approach supported the exploitation of frequency hopping gains between NB-IoT carriers with objectives like enhancing the coverage level or reducing the amount of repetitions and interference. Results showed potential SNR (signal-to-noise ratio) gains by including frequency diversity patterns on the transmission scheme.

This example arises from the fact that NB-IoT is considered a narrowband system with disregard of the wireless channel presented on the system. In the same way could it be considered for GSM carriers which occupy 200 KHz. With only 200 kHz bandwidth, typical coherence bandwidth of channels oscillates from approximately 200 kHz (Extended Typical Urban model) to several Megahertz in indoor environments. Flat fading is then a common assumption on NB-IoT, meaning that if a fading event occurs, all signal bandwidth is affected. Hence, on basis of having knowledge of the wireless channel and its coherence characteristics (frequency in this case) it is possible to adopt transmission schemes like frequency hopping which incorporate this information. Nevertheless, depending on the setup scenario, deployment considerations are to be taken into account. For example, on presence of large coherence bandwidth channels (e.g. an indoor industrial scenario) the frequency hopping scheme should include transmissions separated by several Megahertz which would not make possible guard-band deployment where NB-IoT carriers are typically spread over the LTE guard-band (typically less than 1 MHz).

In a similar manner, a vehicular scenario (i.e. cars on a highway) might present a wireless channel where the critical coherence dimension is the space (blockage obstacles). In such scenario, after measuring the space coherence of the channel, the transmission should be adapted not only considering the time dimension but also the velocity of the mobile terminal (vehicle in this case).

Embodiments of the present invention address the above-described drawbacks of the received power being degraded by the deficiency of the wireless propagation channel due to the lack of diversity usually provided by additional antennas at either side of the communication link. Embodiments provide approaches which are beneficial in that multiple radio resources used jointly allow to exploit/benefit from diversity gains resulting in improved reliability and resilience against e.g. fading events. Furthermore, aggregated or jointly used radio resources when selected such that they experience uncorrelated fading statistics will effectively harden the joint channel and stabilized the exploitable joint channel capacity across all resources. Multiplexing data on and/or across these radio resources allow for a low fluctuating data transmission even under fading uncertainty. Moreover, the knowledge about the root cause of effective radio channel degradation in a given radio propagation environment allows to choose resource selection and combination parameters such that e.g. the diversity gain can be maximized and/or the effective channel throughput variations can be minimized.

Figure 1B:
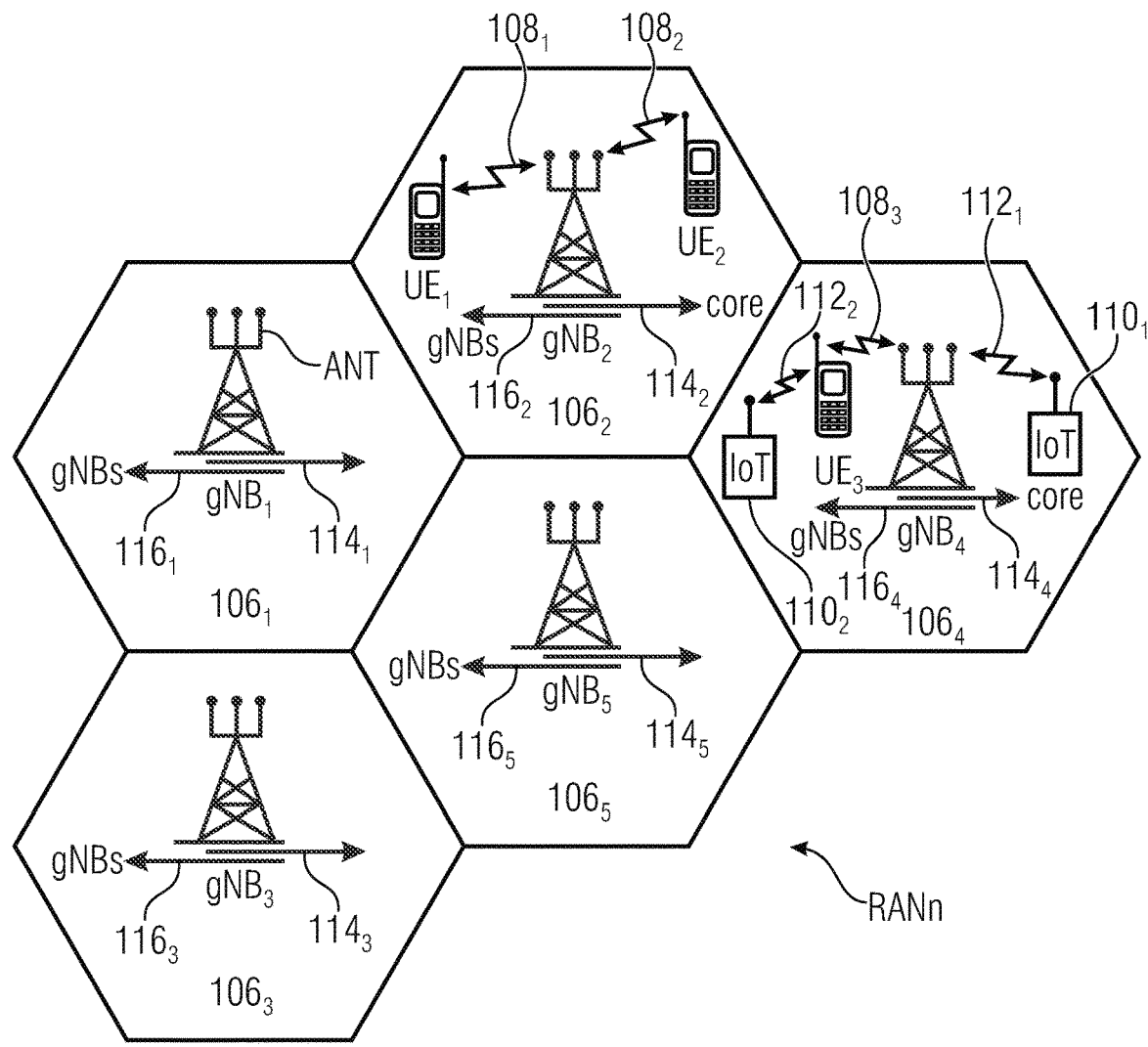
Figure 2:
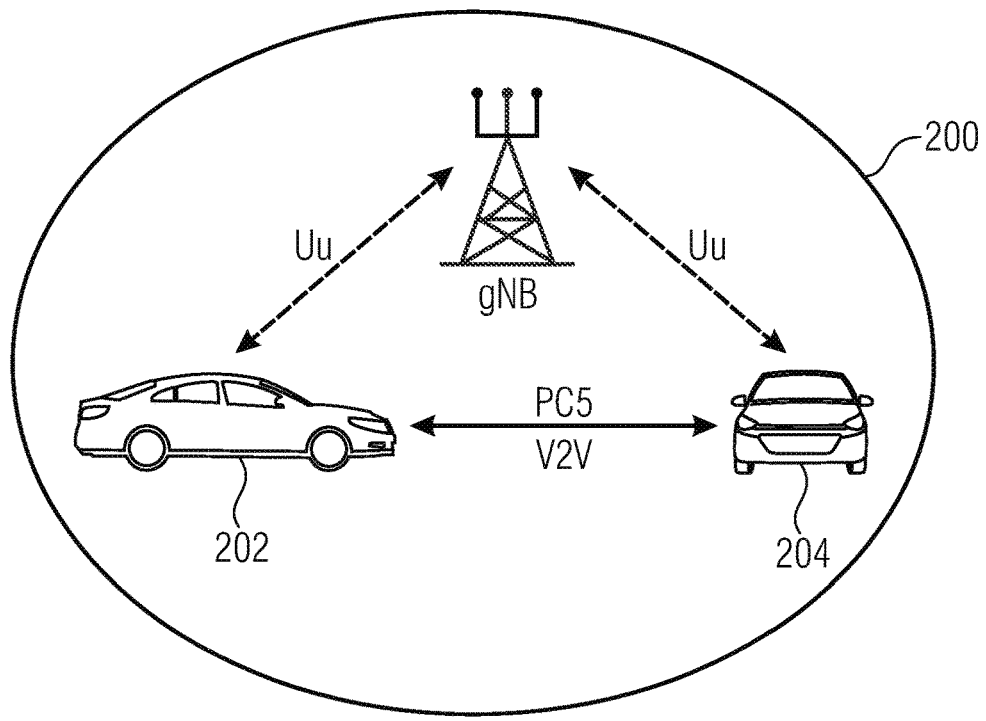
FIG. 2 is a schematic representation of an in-coverage scenario in which two UEs directly communicating with each other are both connected to a base station.
Figure 3:
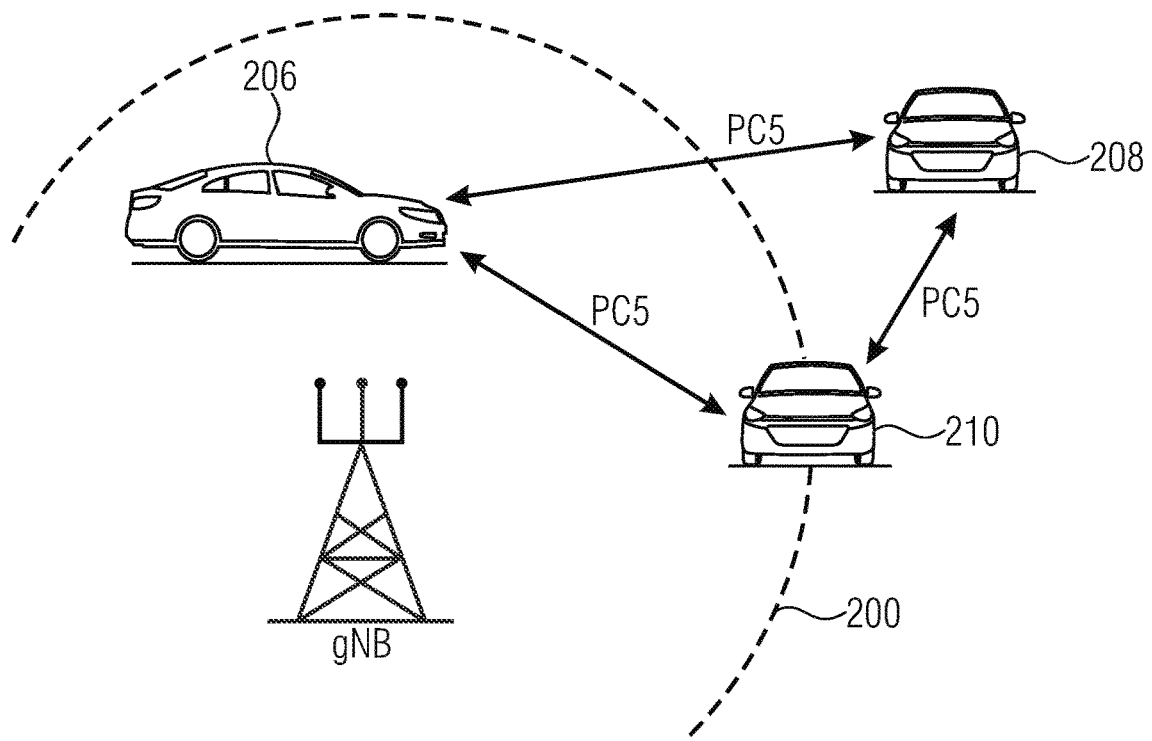
FIG. 3 is a schematic representation of an out-of-coverage scenario in which the UEs directly communicating with each other.
Figure 8:
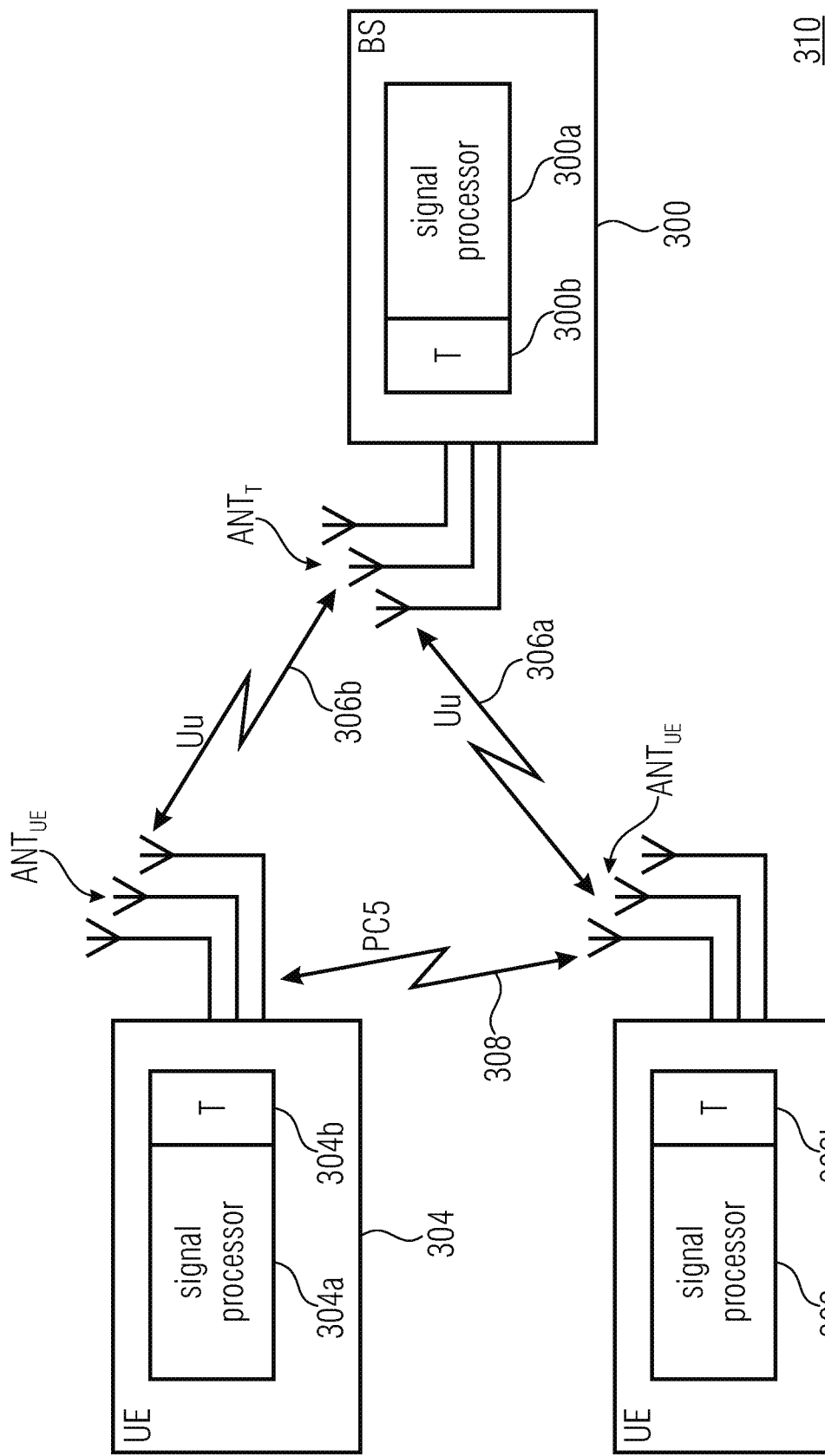
FIG. 8 is a schematic representation of a wireless communication system including a transmitter, like a base station, and one or more receivers, like user devices, UEs capable of operating in accordance with embodiments of the present invention.

The present invention provides approaches for implementing the above-mentioned aspects, and embodiments of the present invention may be implemented in a wireless communication system as depicted in FIG. 1, FIG. 2 or FIG. 3 including base stations and users, like mobile terminals or IoT devices. FIG. 8 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink (SL) interface. When the UEs are not served by the base station, are not be connected to a base station, for example, they are not in an RRC connected state, or, more generally, when no SL resource allocation configuration or assistance is provided by a base station, the UEs may communicate with each other over the sidelink (SL). The system or network of FIG. 8, the one or more UEs 302, 304 of FIG. 8, and the base station 300 of FIG. 8 may operate in accordance with the inventive teachings described herein.

The present invention provides a user device, UE, for a wireless communication system, using a transmission scheme on a radio resource, wherein the user device is to determine one or more parameters of a radio channel associated with the radio resource, and to adapt the transmission scheme by selecting an additional radio resource on the basis of the determined one or more parameters.

In accordance with embodiments, the parameters are a probability that the line of sight for the transmission is blocked.

In accordance with embodiments, the parameters are coherence parameters of the radio channel.

In accordance with embodiments, the coherence parameters refer to one or more of time, space, frequency and/or polarization.

In accordance with embodiments, the user device is to adapt the transmission scheme such that radio resource and the additional radio resource are statistically uncorrelated, by selection of the additional radio resource such that the difference between the radio resource and the additional radio resource with regard to the determined parameters is larger than the coherence parameter, or the user device is to adapt the transmission scheme such that radio resource and the additional radio resource are statistically correlated, by selection of the additional radio resource such that the difference between the radio resource and the additional radio resource with regard to the determined parameters is smaller than the coherence parameter.

In accordance with embodiments, the user device is to determine the one or more coherence parameters by using reference symbols, RS.

In accordance with embodiments, the reference symbols are included within the transmission scheme.

In accordance with embodiments, the user device is further to transmit one or more of the determined parameters and/or the adapted transmission scheme to another device for the wireless communication system.

In accordance with embodiments, the user device is to transmit a relevant selection of the determined parameters.

In accordance with embodiments, the user device is to transmit the determined parameters or the relevant selection of the determined parameters compressed or uncompressed.

In accordance with embodiments, the user device is to transmit, together with the parameters, one or more of
  a user device-specific field parameter referring to downlink control information, DCI, to set up transmission schemes with k-repetitions separated in time,
  a user device-specific field parameter referring to a random-access procedure, to inform the another device about the dynamics of the user device,
  a field associated to the DCI, including a frequency separation value,
  an addition of a field-parameter on the broadcast system information block, SIB, containing a value indicating a frequency separation,
  information of prior observed degradation events, and/or information referring to clustering of user devices.

In accordance with embodiments, the another device is a base station, BS, or a user device, UE.

In accordance with embodiments, the user device is to adapt the transmission scheme by including one or more of
  retransmission,
  parallel transmissions,
  alternating transmissions, and/or
  packet splitting.

The present invention provides a base station, BS, for a wireless communication system, using a transmission scheme on a radio resource, wherein the base station is to determine one or more parameters of a radio channel associated with the radio resource, and to adapt the transmission scheme by selecting an additional radio resource on the basis of the determined one or more parameters.

In accordance with embodiments, the parameters are a probability that the line of sight for the transmission is blocked.

In accordance with embodiments, the parameters are coherence parameters of the radio channel.

In accordance with embodiments, the coherence parameters refer to one or more of time, space, frequency and/or polarization.

In accordance with embodiments, the base station is to adapt the transmission scheme such that radio resource and the additional radio resource are statistically uncorrelated, by selection of the additional radio resource such that the difference between the radio resource and the additional radio resource with regard to the determined parameters is larger than the coherence parameter, or the base station is to adapt the transmission scheme such that radio resource and the additional radio resource are statistically correlated, by selection of the additional radio resource such that the difference between the radio resource and the additional radio resource with regard to the determined parameters is smaller than the coherence parameter.

In accordance with embodiments, the base station is to determine the one or more coherence parameters by using reference symbols, RS.

In accordance with embodiments, the reference symbols are included within the transmission scheme.

In accordance with embodiments, the base station is further to transmit one or more of the determined parameters and/or the adapted transmission scheme to another device for the wireless communication system.

In accordance with embodiments, the base station is to transmit a relevant selection of the determined parameters.

In accordance with embodiments, the base station is to transmit the determined parameters or the relevant selection of the determined parameters compressed or uncompressed.

In accordance with embodiments, the base station is to transmit, together with the parameters, one or more of
- a base station-specific field parameter referring to downlink control information, DCI, to set up transmission schemes with k-repetitions separated in time,
- a base station-specific field parameter referring to a random-access procedure, to inform the another device about the dynamics of the base station,
- a field associated to the DCI, including a frequency separation value,
- an addition of a field-parameter on the broadcast system information block, SIB, containing a value indicating a frequency separation,
- information of prior observed degradation events, and/or information referring to clustering of user devices.

In accordance with embodiments, the another device is a base station, BS, or a user device, UE.

In accordance with embodiments, the base station is to adapt the transmission scheme by including one or more of
- retransmission,
- parallel transmissions,
- alternating transmissions, and/or
- packet splitting.

The present invention provides a wireless communication system, comprising two or more devices in accordance with the first aspect of the present invention.

In accordance with embodiments, at least one of the devices is a base station.

The present invention provides, a method of operating a user device, UE, for a wireless communication system, using a transmission scheme on a radio resource, comprising determining one or more parameters of a radio channel associated with the radio resource, and adapting the transmission scheme by selecting an additional radio resource on the basis of the determined one or more parameters.

In accordance with embodiments, the parameters are a probability that the line of sight for the transmission is blocked.

In accordance with embodiments, the parameters are coherence parameters of the radio channel.

In accordance with embodiments, the coherence parameters refer to one or more of time, space, frequency and/or polarization.

In accordance with embodiments, adapting the transmission scheme is performed such that radio resource and the additional radio resource are statistically uncorrelated, by selecting the additional radio resource such that the difference between the radio resource and the additional radio resource with regard to the determined parameters is larger than the coherence parameter, or adapting the transmission scheme is performed such that radio resource and the additional radio resource are statistically correlated, by selecting the additional radio resource such that the difference between the radio resource and the additional radio resource with regard to the determined parameters is smaller than the coherence parameter.

In accordance with embodiments, the determination of the one or more coherence parameters is performed by using reference symbols, RS.

In accordance with embodiments, the reference symbols are included within the transmission scheme.

In accordance with embodiments, the method further comprises transmitting one or more of the determined parameters and/or the adapted transmission scheme to another device for the wireless communication system.

In accordance with embodiments, the step of transmitting transmits a relevant selection of the determined parameters.

In accordance with embodiments, in the step of transmitting the determined parameters or the relevant selection of the determined parameters are transmitted compressed or uncompressed.

In accordance with embodiments, in the step of transmitting, together with the parameters, one or more is transmitted of
- a user device-specific field parameter referring to downlink control information, DCI, to set up transmission schemes with k-repetitions separated in time,
- a user device-specific field parameter referring to a random-access procedure, to inform the another device about the dynamics of the user device,
- a field associated to the DCI, including a frequency separation value,
- an addition of a field-parameter on the broadcast system information block, SIB, containing a value indicating a frequency separation,
- information of prior observed degradation events, and/or information referring to clustering of user devices.

In accordance with embodiments, the another device is a base station, BS, or a user device, UE.

In accordance with embodiments, the adapting of the transmission scheme is performed by including one or more of
- retransmission,
- parallel transmissions,
- alternating transmissions, and/or
- packet splitting.

The present invention provides, a method of operating a base station, BS, for a wireless communication system, using a transmission scheme on a radio resource, comprising determining one or more parameters of a radio channel associated with the radio resource, and adapting the transmission scheme by selecting an additional radio resource on the basis of the determined one or more parameters.

In accordance with embodiments, the parameters are a probability that the line of sight for the transmission is blocked.

In accordance with embodiments, the parameters are coherence parameters of the radio channel.

In accordance with embodiments, the coherence parameters refer to one or more of time, space, frequency and/or polarization.

In accordance with embodiments, adapting the transmission scheme is performed such that radio resource and the additional radio resource are statistically uncorrelated, by selecting the additional radio resource such that the difference between the radio resource and the additional radio resource with regard to the determined parameters is larger than the coherence parameter, or adapting the transmission scheme is performed such that radio resource and the additional radio resource are statistically correlated, by selecting the additional radio resource such that the difference between the radio resource and the additional radio resource with regard to the determined parameters is smaller than the coherence parameter.

In accordance with embodiments, the determination of the one or more coherence parameters is performed by using reference symbols, RS.

In accordance with embodiments, the reference symbols are included within the transmission scheme.

In accordance with embodiments, the method further comprises transmitting one or more of the determined parameters and/or the adapted transmission scheme to another device for the wireless communication system.

In accordance with embodiments, the step of transmitting transmits a relevant selection of the determined parameters.

In accordance with embodiments, in the step of transmitting the determined parameters or the relevant selection or determined parameters are transmitted compressed or uncompressed.

In accordance with embodiments, in the step of transmitting, together with the parameters, one or more is transmitted of
- a base station-specific field parameter referring to downlink control information, DCI, to set up transmission schemes with k-repetitions separated in time,
- a base station-specific field parameter referring to a random-access procedure, to inform the another device about the dynamics of the base station,
- a field associated to the DCI, including a frequency separation value,
- an addition of a field-parameter on the broadcast system information block, SIB, containing a value indicating a frequency separation,
- information of prior observed degradation events, and/or information referring to clustering of user devices.

In accordance with embodiments, the another device is a base station, BS, or a user device, UE.

In accordance with embodiments, the adapting of the transmission scheme is performed by including one or more of
- retransmission,
- parallel transmissions,
- alternating transmissions, and/or
- packet splitting.

Embodiments of the present invention provide a computer program product comprising instructions which, when the program is executed by a computer, causes the computer to carry out one or more methods in accordance with the present invention.

In accordance with embodiments of the present invention, approaches are provided for improving the radio link of wireless systems by means of achieving channel diversity and using resource allocation or packet distribution schemes beyond the coherence time and bandwidth.

Figure 4:
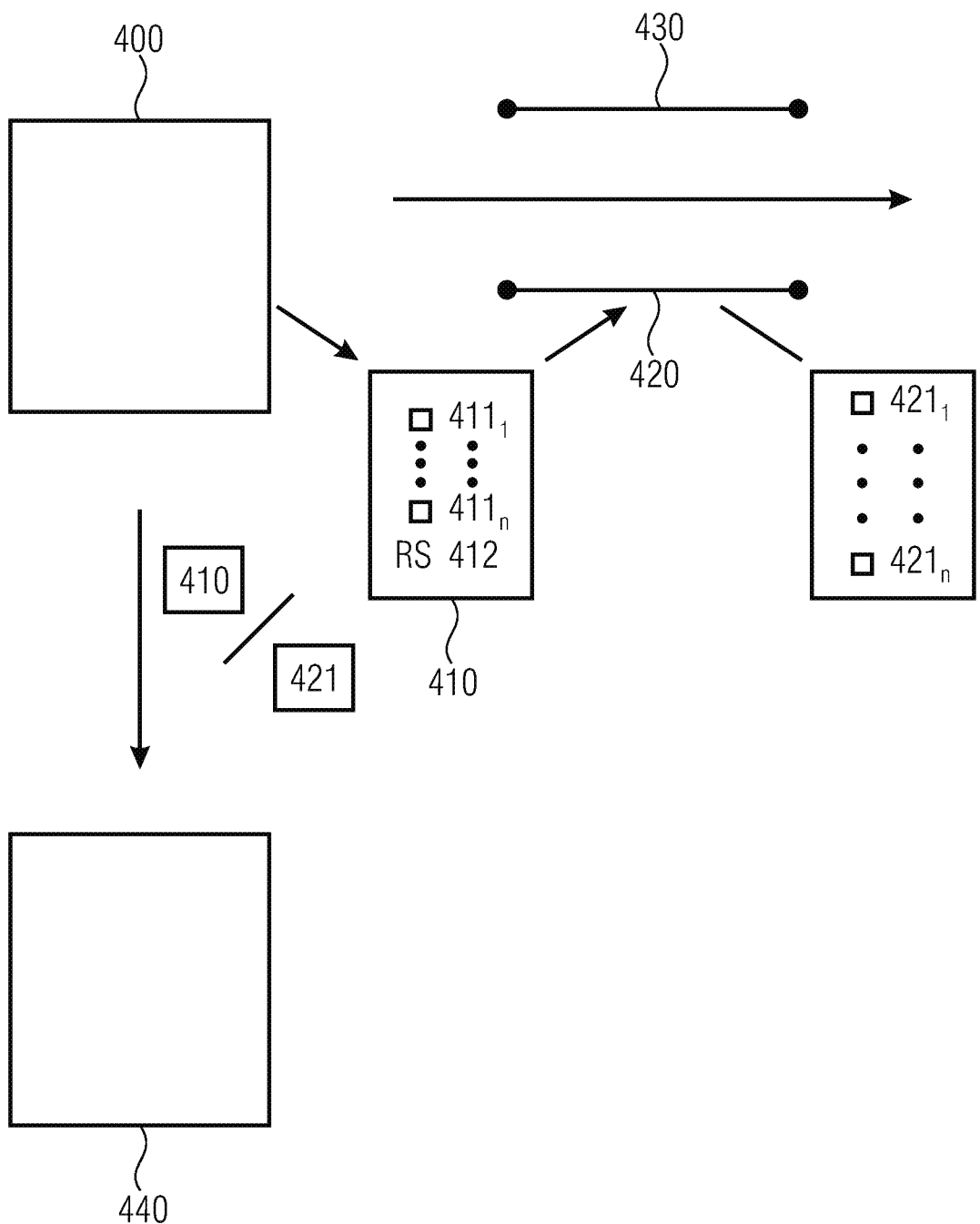
FIG. 4 is a schematic representation of a user device, capable of operating in accordance with embodiments of the present invention.

The presented solution can be employed in a user device. FIG. 4 shows a user device 400, UE, for a wireless communication system, using a transmission scheme 410 on a radio resource 420. The user device 400 can determine one or more parameters 421 of a radio channel associated with the radio resource 420, and to adapt the transmission scheme 410 by selecting an additional radio resource 430 on the basis of the determined one or more parameters 421. Such parameters 421 can for example be a probability that the line of sight for the transmission is blocked. But such parameters 421 can also be coherence parameters of the radio channel. The coherence parameters can refer to one or more of time, space, frequency and/or polarization.

The user device 400 can adapt the transmission scheme 410 such that the radio resource 420 and the additional radio resource 430 are statistically correlated or statistically uncorrelated.

The radio resources 420 and 430 are statistically uncorrelated, for example by selection of the additional radio resource 430 such that the difference between the radio resource 420 and the additional radio resource 430 with regard to the determined parameters 421 is larger than the coherence parameter.

And the radio resources 420 and 430 are statistically correlated, for example by selection of the additional radio resource 430 such that the difference between the radio resource 420 and the additional radio resource 430 with regard to the determined parameters 421 is smaller than the coherence parameter.

The user device 400 can determine the one or more coherence parameters by using reference symbols 412, RS, which can be included within the transmission scheme 410. The user device 400 can further to transmit one or more of the determined parameters 421 and/or the adapted transmission scheme 410 to another device 440 for the wireless communication system. The user device 400 can also only transmit a relevant selection of the determined parameters 421. Further, the user device 400 can transmit the determined parameters 421 or the relevant selection of the determined parameters 421 compressed or uncompressed. Finally, the user device 400 can additionally transmit, together with the parameters 421, one or more of the following: A user device-specific field parameter referring to downlink control information, DCI, to set up transmission schemes with k-repetitions separated in time; a user device-specific field parameter referring to a random-access procedure, to inform the another device about the dynamics of the user device 400; a field associated to the DCI, including a frequency separation value; an addition of a field-parameter on the broadcast system information block, SIB, containing a value indicating a frequency separation; information of prior observed degradation events; and/or information referring to clustering of user devices.

The user device 400 can transmit the parameters 421, or a relevant selection thereof, or the adapted transmission scheme 410 to a base station, BS, or another user device, UE. Also, the adaption of the transmission scheme 410 by the user device 400 can include one or more of retransmission, parallel transmissions, alternating transmissions, and/or packet splitting.

Figure 5:
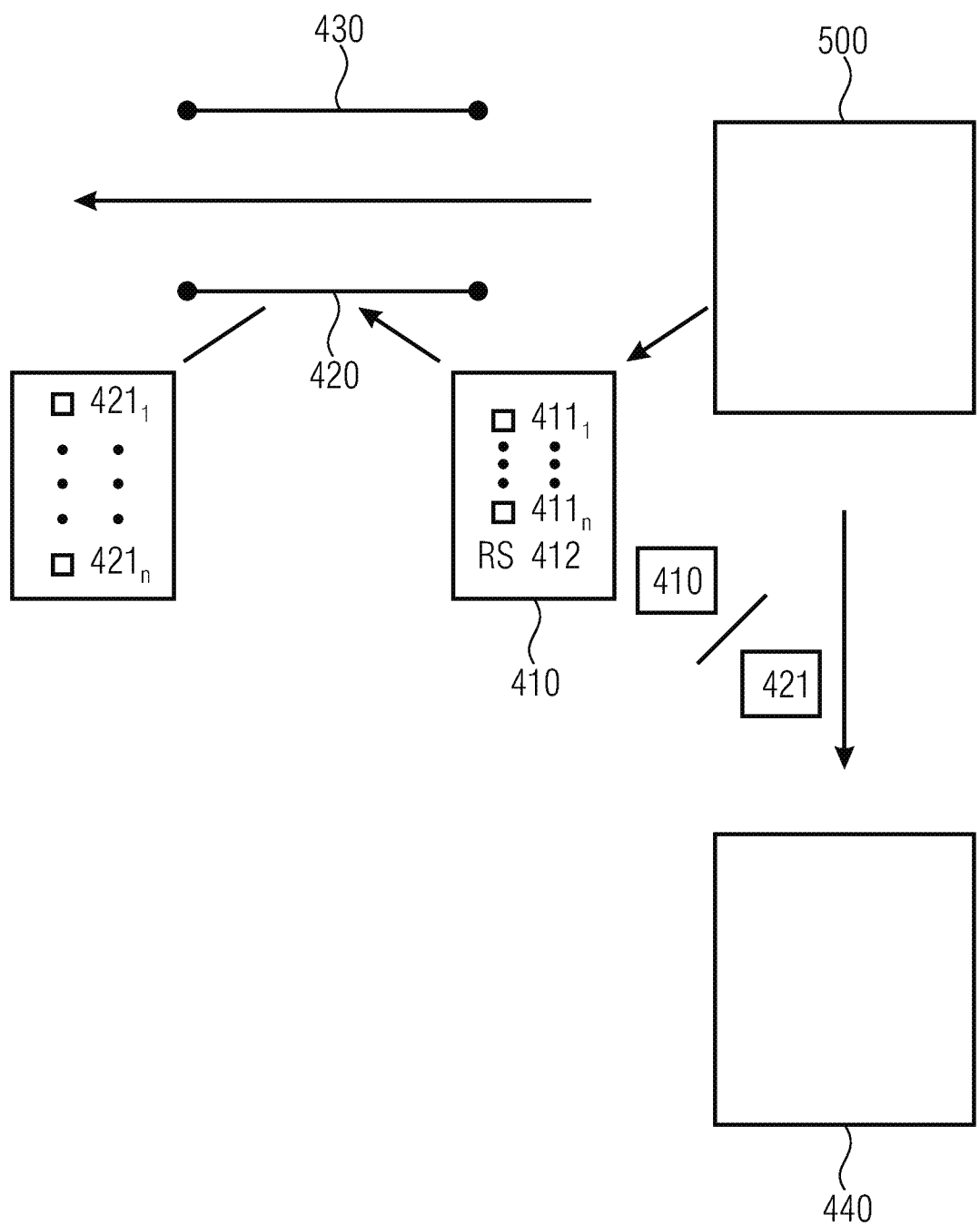
FIG. 5 is a schematic representation of a base station, capable of operating in accordance with embodiments of the present invention.

The presented solution can also be employed in a base station. FIG. 5 shows a base station 500, BS, for a wireless communication system, using a transmission scheme 410 on a radio resource 420. The base station can determine one or more parameters 421 of a radio channel associated with the radio resource 420, and to adapt the transmission scheme 410 by selecting an additional radio resource 430 on the basis of the determined one or more parameters 421. Such parameters 421 can for example be a probability that the line of sight for the transmission is blocked. But such parameters 421 can also be coherence parameters of the radio channel. The coherence parameters can refer to one or more of time, space, frequency and/or polarization.

The base station 500 can adapt the transmission scheme 410 such that the radio resource 420 and the additional radio resource 430 are statistically correlated or statistically uncorrelated.

The radio resources 420 and 430 are statistically uncorrelated, for example by selection of the additional radio resource 430 such that the difference between the radio resource 420 and the additional radio resource 430 with regard to the determined parameters 421 is larger than the coherence parameter.

And the radio resources 420 and 430 are statistically correlated, for example by selection of the additional radio resource 430 such that the difference between the radio resource 420 and the additional radio resource 430 with regard to the determined parameters 421 is smaller than the coherence parameter.

The base station 500 can determine the one or more coherence parameters by using reference symbols 412, RS, which can be included within the transmission scheme 410. The base station 500 can further to transmit one or more of the determined parameters 421 and/or the adapted transmission scheme 410 to another device 440 for the wireless communication system. The base station 500 can also only transmit a relevant selection of the determined parameters 421. Further, the base station 500 can transmit the determined parameters 421 or the relevant selection of the determined parameters 421 compressed or uncompressed. Finally, the base station 500 can additionally transmit, together with the parameters 421, one or more of the following:

A base station-specific field parameter referring to downlink control information, DCI, to set up transmission schemes with k-repetitions separated in time; a base station-specific field parameter referring to a random-access procedure, to inform the another device about the dynamics of the base station 500; a field associated to the DCI, including a frequency separation value; an addition of a field-parameter on the broadcast system information block, SIB, containing a value indicating a frequency separation; information of prior observed degradation events; and/or information referring to clustering of user devices.

The base station 500 can transmit the parameters 421, or a relevant selection thereof, or the adapted transmission scheme 410 to another base station, BS, or a user device, UE. Also, the adaption of the transmission scheme 410 by the base station 500 can include one or more of retransmission, parallel transmissions, alternating transmissions, and/or packet splitting.

The presented solution can also be employed in a wireless communication system, comprising of user devices 400 and base stations 500 as described above. At least one of the devices in the system is a base station 500.

Figure 6:
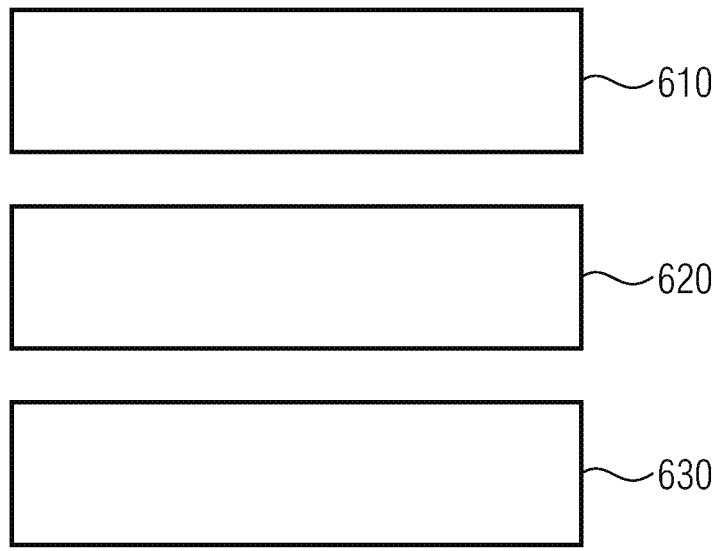
FIG. 6 is a schematic flowchart of a method of operating a user device in accordance with embodiments of the present invention.
Figure 7:
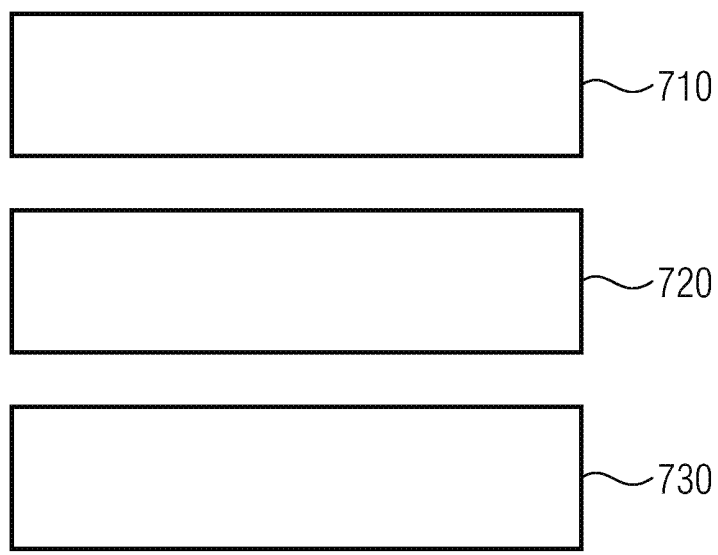
FIG. 7 is a schematic flowchart of a method of operating a base station in accordance with embodiments of the present invention.

The presented solution can also be embodied in a method for operating a user device 400 or a base station 500. FIGS. 6 and 7 show the corresponding methods.

Method 600 refers to operating a user device, UE, for a wireless communication system, using a transmission scheme on a radio resource. Method 700 refers to operating a base station, BS, for a wireless communication system, using a transmission scheme on a radio resource.

The method 600 of operating a user device comprises a step of determining 610 one or more parameters of a radio channel associated with the radio resource, and a second step of adapting 620 the transmission scheme by selecting an additional radio resource on the basis of the determined one or more parameters.

Similar, the method 700 of operating a base station comprises a step of determining 710 one or more parameters of a radio channel associated with the radio resource, and a second step of adapting 720 the transmission scheme by selecting an additional radio resource on the basis of the determined one or more parameters.

For each of method 600 and 700, the parameters can be a probability that the line of sight for the transmission is blocked, but can also be coherence parameters of the radio channel. The coherence parameters can refer to one or more of time, space, frequency and/or polarization. The steps of adapting 620 and 720 the transmission scheme can be performed such that the radio resource and the additional radio resource are statistically correlated or statistically uncorrelated.

The radio resources are statistically uncorrelated, for example by selecting the additional radio resource such that the difference between the radio resource and the additional radio resource with regard to the determined parameters is larger than the coherence parameter.

And the radio resources are statistically correlated, for example by selecting the additional radio resource such that the difference between the radio resource and the additional radio resource with regard to the determined parameters is smaller than the coherence parameter.

In methods 600 and 700, the determination of the one or more coherence parameters is performed by using reference symbols, RS, which can be included within the transmission scheme.

Method 600 can further comprise a step of transmitting 630 one or more of the determined parameters and/or the adapted transmission scheme to another device for the wireless communication system. Likewise, method 700 can further comprise a step of transmitting 730 one or more of the determined parameters and/or the adapted transmission scheme to another device for the wireless communication system.

The step of transmitting 630 or 730 can also only transmit a relevant selection of the determined parameters, and the determined parameters or the relevant selection of the determined parameters can also be transmitted compressed or uncompressed in step 630 or 730.

Method 600 can, in in the step of transmitting 630, transmit, together with the parameters, one or more of: a user device-specific field parameter referring to downlink control information, DCI, to set up transmission schemes with k-repetitions separated in time; a user device-specific field parameter referring to a random-access procedure, to inform the another device about the dynamics of the user device; a field associated to the DCI, including a frequency separation value; an addition of a field-parameter on the broadcast system information block, SIB, containing a value indicating a frequency separation; information of prior observed degradation events; and/or information referring to clustering of user devices.

For method 600, the parameters, or a relevant selection thereof, or the adapted transmission scheme can be transmitted to a base station, BS, or another user device, UE.

In the same manner, method 700 can, in in the step of transmitting 630, transmit, together with the parameters, one or more of: a base station-specific field parameter referring to downlink control information, DCI, to set up transmission schemes with k-repetitions separated in time; a base station-specific field parameter referring to a random-access procedure, to inform the another device about the dynamics of the base station; a field associated to the DCI, including a frequency separation value; an addition of a field-parameter on the broadcast system information block, SIB, containing a value indicating a frequency separation; information of prior observed degradation events; and/or information referring to clustering of user devices.

And for method 700, the parameters, or a relevant selection thereof, or the adapted transmission scheme can be transmitted to another base station, BS, or a user device, UE. For both methods, method 600 and 700, the adapting 620 and 720 of the transmission scheme can include one or more of retransmission, parallel transmissions, alternating transmissions, and/or packet splitting.

In more detail, the presented technical solutions include the following elements:
- Identification of channel specific parameters relevant for resources selection,
- Reporting channel specific parameters relevant for resources selection, and
- Adapting the transmission schemes to combat the degradation event by including strategies beyond the coherence of the channel.

Identification of channel specific parameters relevant for resources selection is exemplary performed by measuring or learning the long-term radio channel characteristics like the large-scale parameters. In particular the use of the radio channel coherence is proposed along one or more degrees of freedom of the wireless propagation channel which is of critical relevance for channel degradation events significantly impacting the quality of service (QoS) on an intended wireless data transmission.

The measurement or learning may include the extraction and/or derivation of parameters (which may include deterministic and stochastic components) describing the coherence dimensions adequately to make suitable decisions regarding scheduling, resource selection, and/or allocation for an improved transmission scheme.

Reference symbols (RS) included within the transmission schemes can be used for the measurement of the coherence dimensions.

Some examples of possible coherence dimensions are: Time, Space, Frequency, and Polarization (i.e. polarization discrimination).

A wide band channel with a narrow band sampling can be measured for example as follows. A downlink direction from a base station (BS) to a terminal (user device, or user equipment, UE) provides a wider system bandwidth like for example 20 MHz with embedded pilots on known time frequency resources. Furthermore, the UE may conclude from observation of the channel on a particular time frequency resource over a sufficiently long observation window that the wireless channel characteristic is either static or slowly changing along the time dimension. Then a narrowband IoT device could synchronize to the frame structure of the eNodeB (eNB) or gNodeB (gNB) in time and frequency and tune the receive filter (in narrowband-IoT this is usually a orthogonal frequency-division multiplexing, OFDM, subcarrier) to the known resource symbol, RS, in the wideband OFDM resource grid.

With appropriate knowledge about the applied beamformer (the applied code book should be static over the measurement time or at least known) at the gNB the device (UE) is able to sample the wideband channel by measuring (also known as hopping) the individual time frequency resources sequentially instead simultaneously due to measurement bandwidth constraints.

Stitching the measured channel components together, assuming a quasi-static channel, the wideband channel can be approximated and estimated. A transformation into time domain using fast Fourier transform, FFT, operation is allowing to extract the channel spread or channel delay of all relevant echoes or multi-path components, MPC, of the wireless channel between the gNB and the device.

The equivalence of the delay spread is the channel coherence time describing a bandwidth within the channel state has similar properties with regard to phases of relevant channel coefficients. Basically, at a frequency resource f2 separated from frequency resource f1 beyond the coherence bandwidth the amplitude and phase cannot be predicted accurately relying on a measurement of phase and amplitude and f1.

In case f1 is a resource suffering from multi path fading, this motivates to choose f2 with a distance of more than the coherence bandwidth away from f1 in order to gain from statistical independent superposition of the multi-path components such that hitting another fade is reduced in probability.

Such a choosing of the resources separated along the degree of freedom (frequency in this example) beyond the coherence value will result in a statistically uncorrelated channel behavior between the two chosen resources and therefore improves resilience against channel degradations when using both resources jointly or alternating for data transmission.

Figure 11:
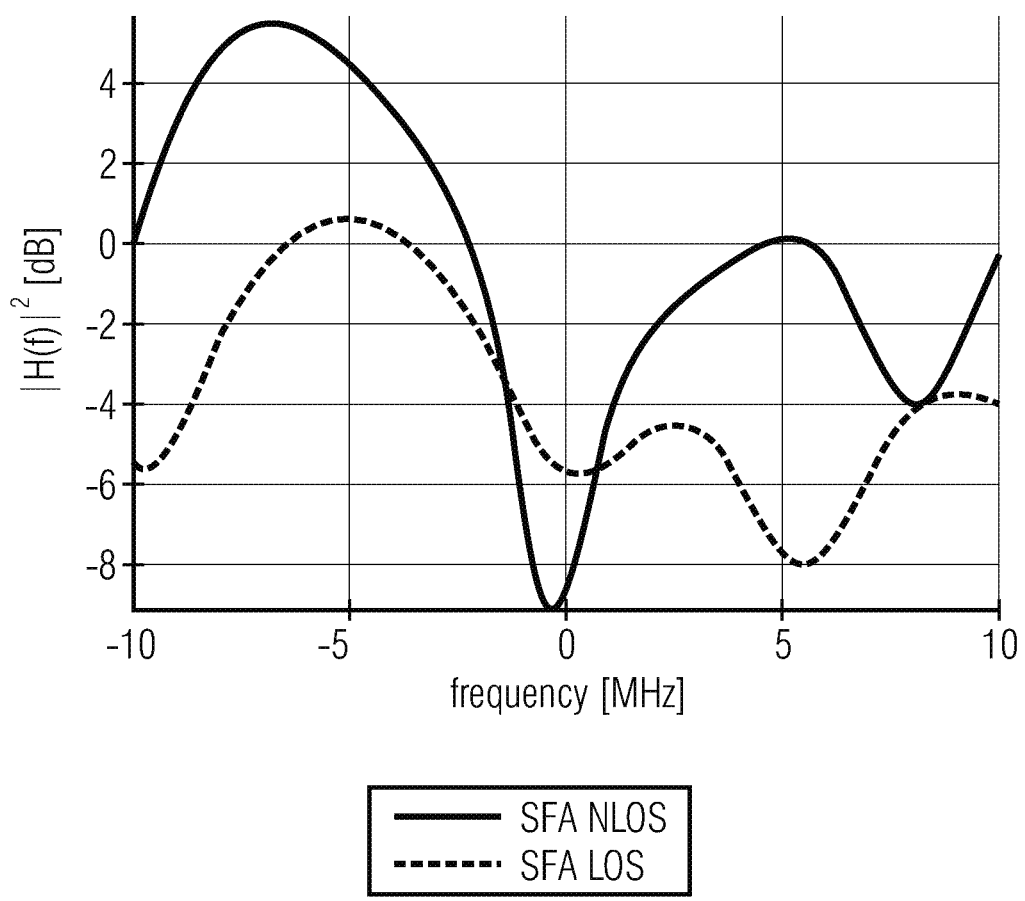
FIG. 11 illustrates channel frequency response of short factory automation measurements.

FIG. 11 shows a channel frequency response of short factory automation, SFA, measurements. Both line-of-sight, LOS, and non-line-of-sight, NLOS, scenarios are shown to present constant channel fading over narrow-band frequency ranges.

As shown in FIG. 11, the coherence bandwidth can be an indicator for a distinct frequency hop, which outperforms a frequency hop into a region, where no correlation of the frequency is available.

Thus, choosing a distinct resource separation along the degree of freedom (frequency in this example) based on the coherence value can improves resilience against channel degradations even beyond statistically uncorrelated frequency components. Therein SFA denotes short frequency automation, LOS denotes line of sight, and NLOS denotes non-line of sight.

It is noted that the other coherence dimensions can equally be used, of course: Time, Space, and Polarization.

Reporting channel specific parameters relevant for resources selection is exemplary performed as follows. After above detailed measurement procedure, the receiver (BS or mobile device) of the one end of the communications link will provide the measurement data explicitly or implicitly, in uncompressed or compressed format, to the other communication partner (BS or mobile device).

The measurement describes or represents a value of a coherence metric relevant for the selection and allocation of radio resources for the actual data transmission. Additional signaling may include other values. Some possible additional signaling information is detailed in the following.

A device-specific field parameter on the DCI can be added in order to set up transmission schemes with k-repetitions separated in time. The solution stands as a semi-persistent scheduling scheme where data packets are repeated a long time to reach time diversity on the wireless channel. The device-specific field parameter can be specific for the user device or the base station, depending on which device is using the signaling.

A device-specific field parameter on the random-access procedure can be added to inform the recipient (base station or user device) about the dynamics of the device. This parameter might contain a measure of the velocity of the terminal and it is used to quantify the coherence time and therefore the separation between k-repetition schemes of the data packets. The device-specific field parameter can be specific for the user device or the base station, depending on which device is using the signaling.

A field associated to the DCI can be added, whereby each user is specified which dimension of diversity to use and the associated setup value (including just a simple frequency separation value).

A field-parameter on the broadcast SIB can be added containing the frequency separation between frequency carriers in order to define frequency hopping pattern. This solution applies to all terminals connected to the base station and provides frequency diversity to the wireless channel.

Prior information of observed degradation events can be added in case of a learning processes. One example for such information regards mobility, i.e. a user device is moving in some direction, thus the base station can predict a blocking event and the channel degradation caused thereby.

Also, information regarding a clustering of user devices, according to the coherence metric values that they present, e.g. based on similar coherence bandwidth, can be added. In this case, for example, the base station can group several user devices and apply similar configuration for the communication with the user devices, e.g. using group-cast.

Adapting the transmission schemes to combat the degradation event by including strategies beyond the coherence of the channel can be performed as follows.

Some examples of measures for adapting the transmission scheme are detailed here. Other changes to the scheme are also possible.

The transmission scheme can be modified by including retransmission, for example by using the hybrid automatic repeat request, HARQ, technique which includes retransmissions that are separated in time, frequency, or coding. This is further detailed below.

The transmission scheme can also be modified by using parallel transmissions, for example at different frequencies, with different codes but at same time.

The transmission scheme can also be modified by using alternate transmissions, for example by changing the selected resource for every package, which would have a similar effect to frequency hopping but without considering repetitions or retransmissions.

Also, the transmission scheme can be modified by packet splitting, for example when more than one carrier is used, either with joint or independent coding using crosswise referencing of packets, for example, packets are re-transmitted on different resource blocks and the information regarding the location of the packets is encoded in each packet header in order to remove the interference, i.e., by using successive interference cancellation (SIC), from previous or preceding blocks after one block is successively decoded. This is also further detailed below.

Figure 10:
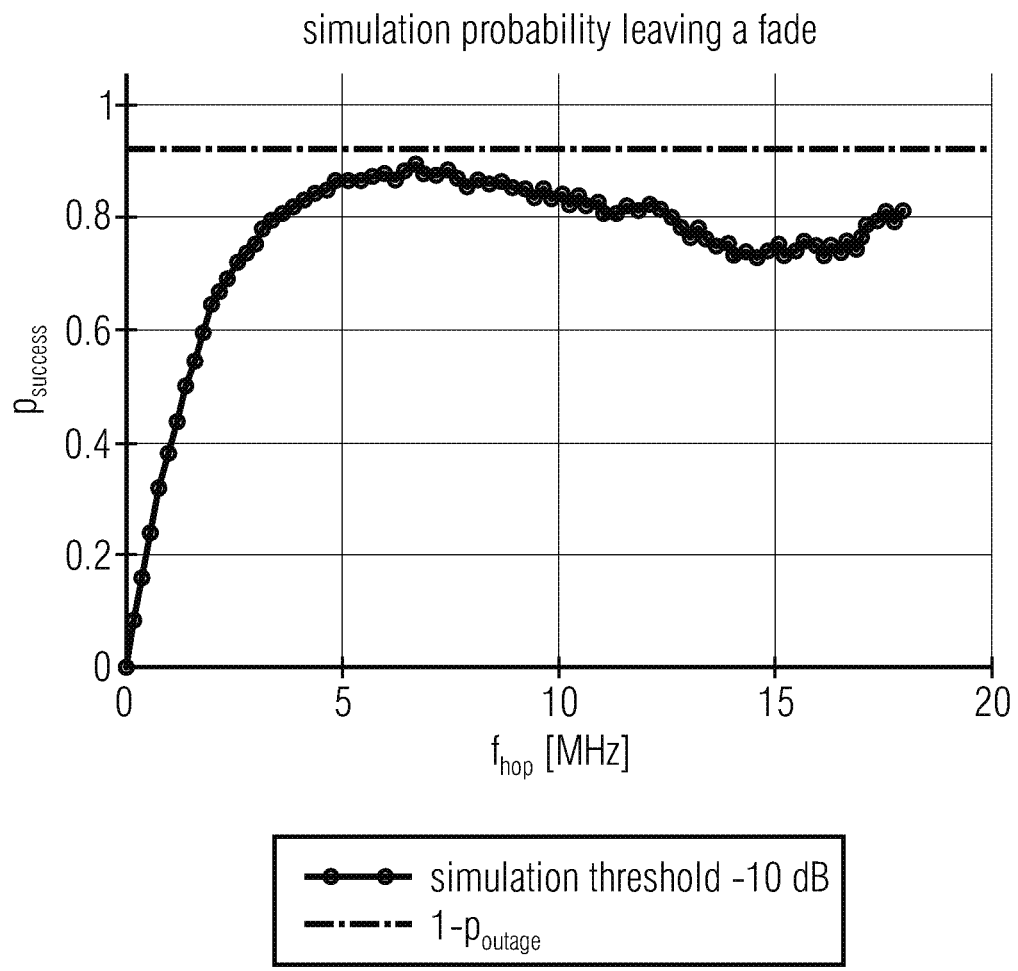
FIG. 10 illustrates channel coherence behavior depending on frequency hop, if fade is present.

Regarding modification of the transmission scheme by retransmission, the following is presented as an example. In narrow-band systems, the signal bandwidth is much smaller than the coherence bandwidth of the wireless channel. This fact is especially true in indoor environments, for example factory automation cells, where the frequency selectivity is considerably low. This can also be seen in FIG. 10, illustrating the frequency response derived from short factory automation, SFA, measurements. FIG. 10 shows a channel coherence behavior depending on frequency hop, if fade is present. The success rate of a signal received above −10 dB is presented for different frequency separations. A sweet spot is visible at around 7 MHz, and after 7 MHz the probability of success is decreasing.

In such conditions, narrow-band systems are subjected to flat channel fading, i.e. the channel fading is approximately constant across the whole signal bandwidth. Flat channel fading is harmful for the wireless transmission system, especially when deep fading events are presented. The degradation event is clear in this case and the coherence dimension refers to frequency. One way to face this deficient channel condition is to include schemes beyond coherence bandwidth. Hence, adding frequency diversity to the transmission protocol is considered. The coherence metric is the coherence bandwidth and can be measured at the base station, BS, by means of the resource symbol, RS, transmitted by the mobile devices on the time-frequency grid. The coherence metric value is later reported to the mobile devices on the downlink control information, DCI.

Figure 12:
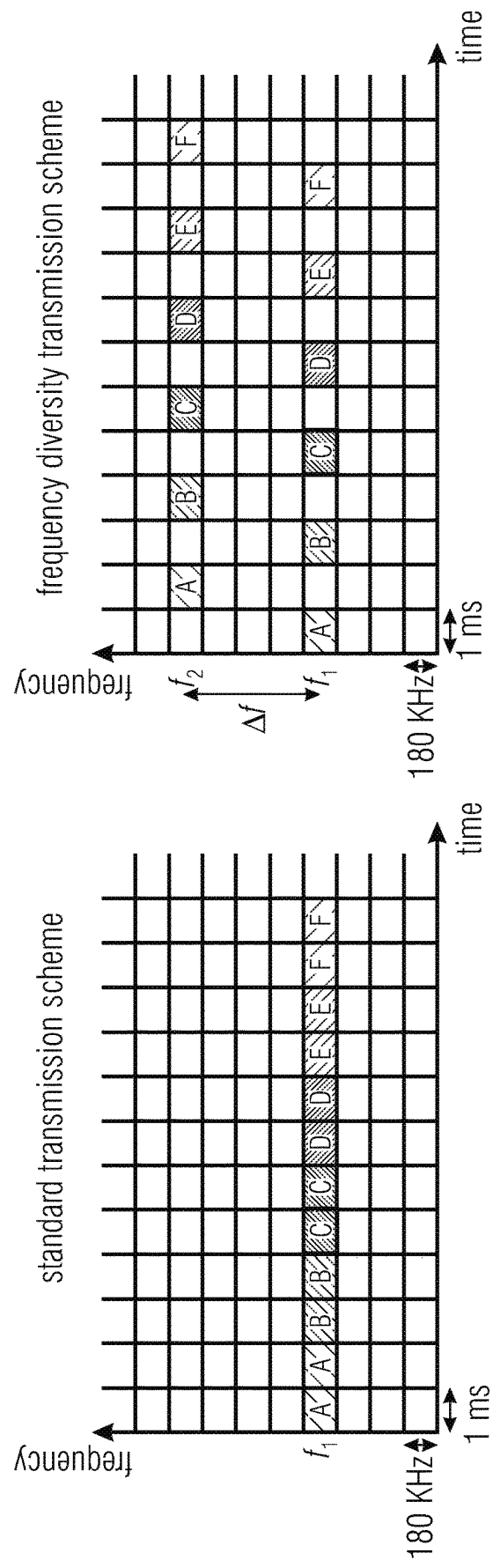
FIG. 12 illustrates a standard scheme and a frequency diversity scheme adapted to a NB-IoT DL transmission with $N_{rep}=2$ in accordance with embodiments.

As a combating mechanism, FIG. 12 displays the difference between the standard scheme (left) and a frequency diversity scheme (right) of a NB-IoT DL transmission adapted to a NB-IoT DL transmission with $N_{rep}=2$. On the latter, frequency hopping is applied to the repetitions of each transport block. The separation between transmission frequencies is given by the frequency offset $\Delta f$. The election of the frequency offset is based on the coherence metric value which is measured and reported by the base station, as discussed above.

Figure 13:
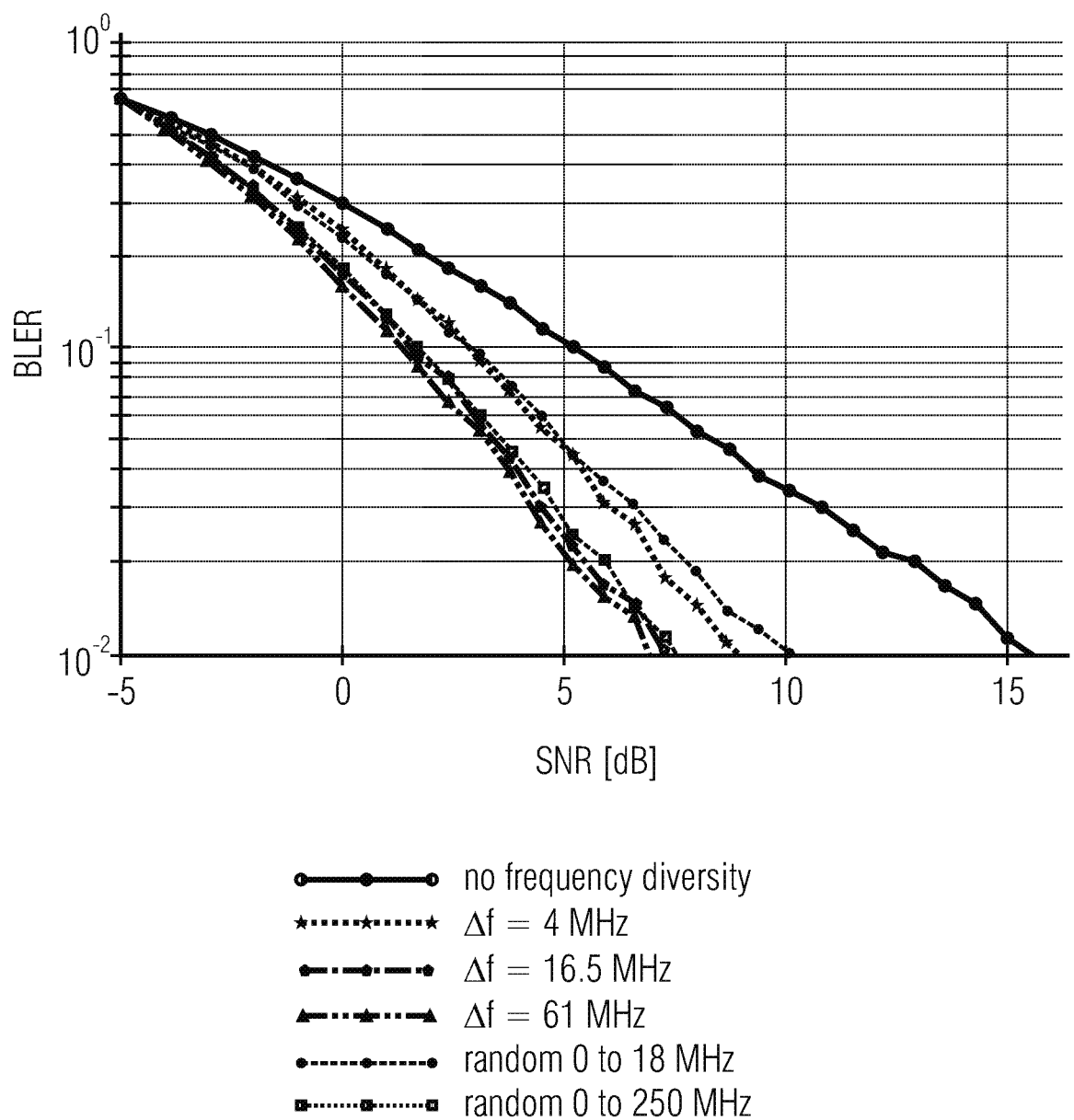
FIG. 13 illustrates block error rate simulations of downlink NB-IoT transmissions with and without frequency diversity; according to embodiments.

FIG. 13 shows block error rate, BLER, simulations of DL NB-IoT transmissions with and without frequency diversity. The results have followed the transmission schemes indicated in FIG. 12. FIG. 13 presents block error rate, BLER, simulation results of DL transmissions incorporating frequency diversity approaches. As observed, the inclusion of any frequency diversity scheme provides apparent gains over the standard transmission scheme. Looking at a $BLER=10^{-2}$, the application of both deterministic and wide random frequency diversity provides SNR gains which arrive up to 8.4 dB.

Regarding modification of the transmission scheme by packet splitting, the following is presented as an example to adapt the transmission schemes to combat the degradation event by coding over several diversity branches. In the case that the user device transmits packets of fixed length in the uplink. Based on the signaling information exchanged with the base station regarding the coherence properties of the channel and the corresponding resource selection, the user device can adapt the packet transmission by coding over several diversity branches.

As an example, a message or packet of k information bits is transmitted over d diversity branches. To adapt the transmission to the number of diversity branches, the user device chooses a channel code of appropriate rate R, where R=k/n, to encode the k information bits. This results in a binary codeword c of n coded bits. After performing modulation, the binary codeword c is mapped on the output complex-valued signal vector s. Before transmission, the signal vector s is divided in d blocks (also called sub-vectors) and each sub-vector is transmitted via the corresponding diversity branch. The receiver collects all d received sub-vectors before decoding the information message.

Figure 14:
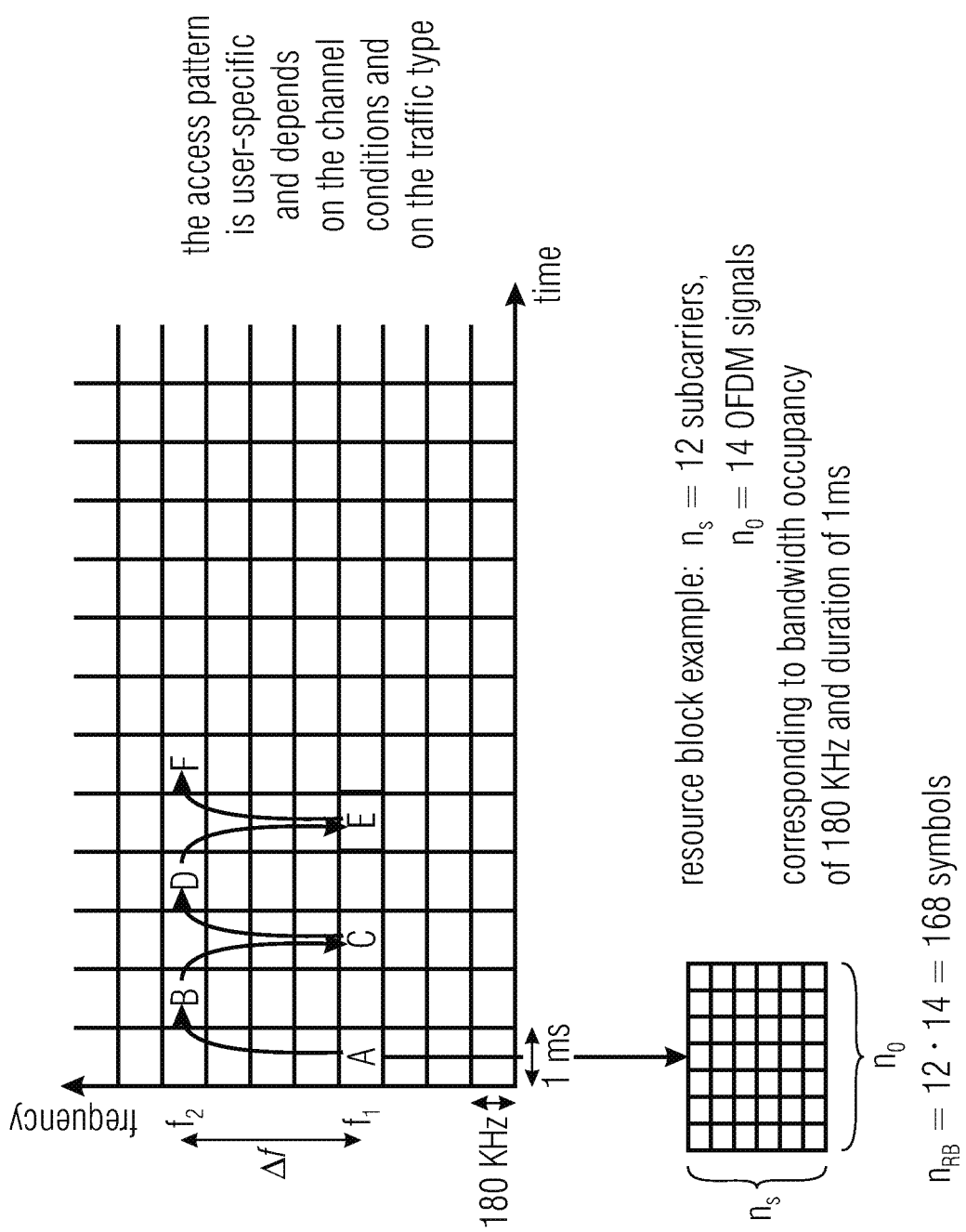
FIG. 14 illustrates coded packet transmission over several diversity branches, for example time-frequency resource blocks.

FIG. 14 shows a coded packet transmission over several diversity branches, in this example time-frequency resource blocks. FIG. 14 illustrates an orthogonal frequency-division multiplexing, OFDM, system where a packet of n=6×168 coded bits, modulated using binary phase shift keying, BPSK, is mapped on 6 resource blocks, RBs, with a pattern as depicted. Each RB consists of 168 resource elements, corresponding to ns=12 subcarriers and n0=14 OFDM symbols.

With a subcarrier spacing of 15 kHz, each RB occupies 180 kHz over 1 ms in time. This gives in total a transmission latency of 6 ms needed to map the message on the 6 resource blocks, i.e. time-frequency diversity branches.

In general, the number and the nature of the selected diversity branches depends on the requirements of the application, i.e. on the traffic type, and should account for the associated latency and bandwidth occupancy. In the following, consider for example an application with high reliability and low latency requirements, e.g. an OFDM based transmission where a fixed message of k=100 bits should be transmitted with a latency target of 1 ms. This corresponds to n=168 symbols in total. Further, a flexible numerology is assumed such that the RBs can span between nO=1 and nO=14 OFDM symbols, with 12 subcarriers with subcarrier spacing of 15 kHz.

Figure 15:
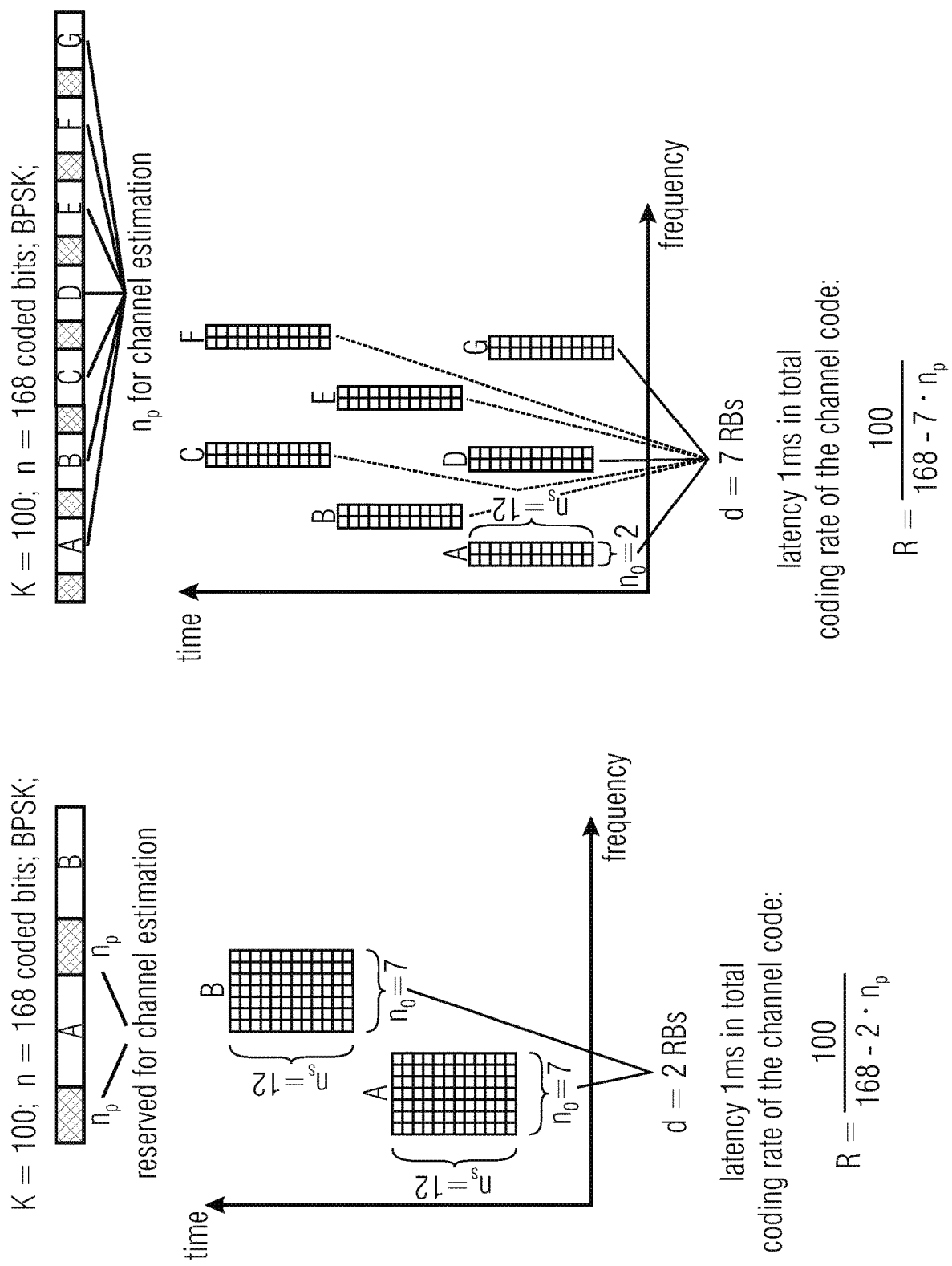
FIG. 15 illustrates coded packet transmission.

FIG. 15 illustrates an example where the packet is either split over d=2 RBs, with each RB of size 12×7=84 resource elements (shown on the left side with ns=12 and no=7), or over d=7 diversity branches of size 12×2=24 resource elements each (shown on the right side with ns=12 and no=2). The transmission over d=7 RBs has the potential to deliver higher reliability, assuming that the RBs experience independent fading conditions.

However, it is noted, that when transmitting over more resource blocks, a fixed portion of the resources n_p in each of the d RBs should be reserved for reliable channel estimation. Hence, the effective coding rate is $R = k/(n - n\_p \times d)$.

In other words, the coding rate R should be adapted to the number of diversity branches. As the number of diversity branches increases, the code rate decreases, resulting in a reliability penalty. Consequently, even if d=7 diversity branches are available in the system, the optimal number of diversity branches to achieve the targeted reliability can be lower than this. The calculation of the optimal number of diversity branches over which the packet should be spread in general depends on the message size, as well as the latency and the reliability target, and should be accounted for in the transmission adaptation mechanisms.

General

In accordance with the present invention, the above described aspects may be used separated from each other or in combination.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, described herein may be one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and needing input from a gateway node at periodic intervals, or a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

The base station, BS, described herein may be implemented as mobile or immobile base station and may be one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

Embodiments of the inventive approach are described for sidelink communications in the context of cellular communication systems, safety communication systems, campus networks. The present invention is not limited to this, rather, in accordance with further embodiments, the inventive approach may be employed in any kind of communication network, e.g. an ad-hoc communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 9:
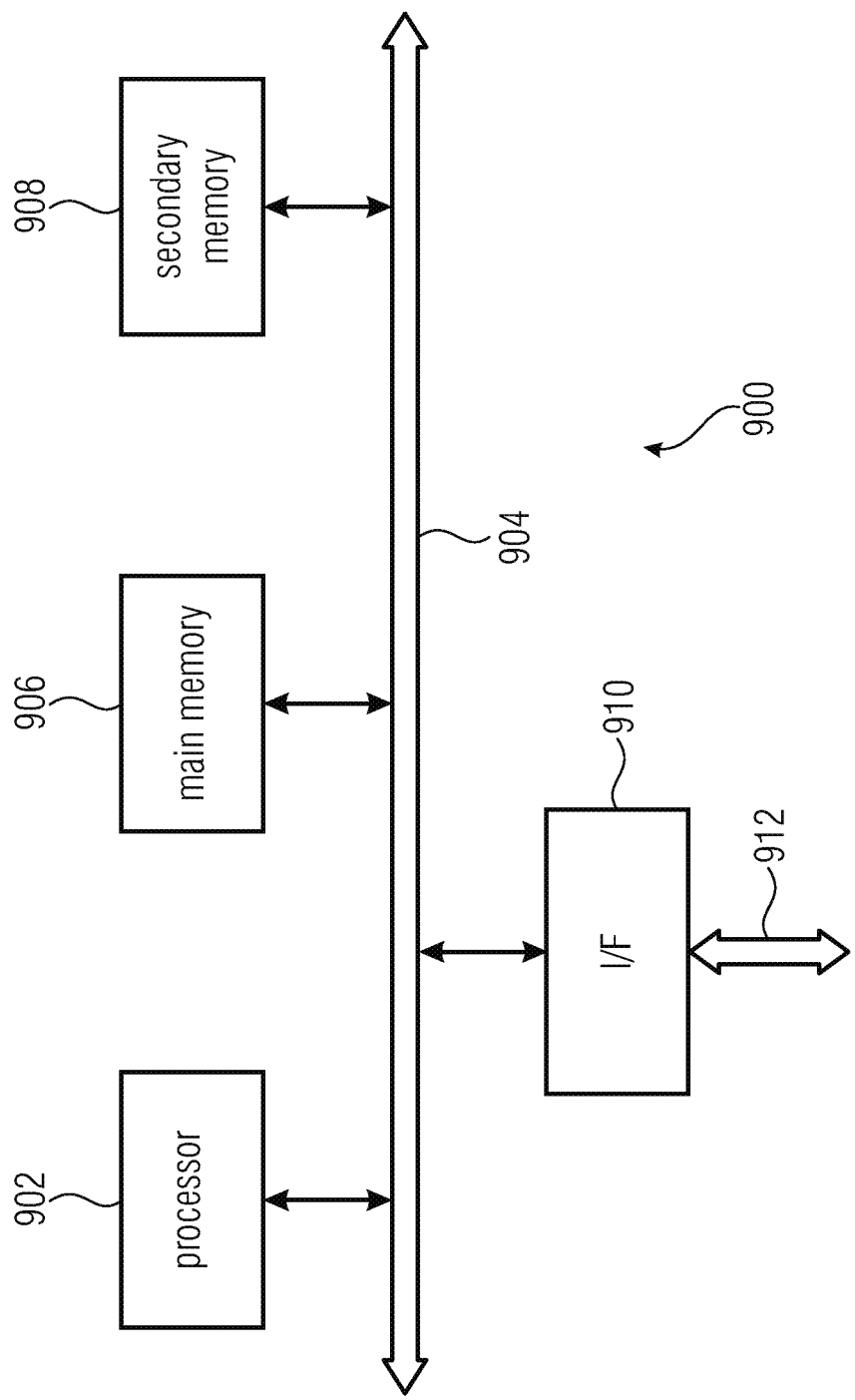
FIG. 9 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 9 illustrates an example of a computer system 900. The units or modules as well as the steps of the methods performed by these units may execute on one or more computer systems 900. The computer system 900 includes one or more processors 902, like a special purpose or a general-purpose digital signal processor. The processor 902 is connected to a communication infrastructure 904, like a bus or a network. The computer system 900 includes a main memory 906, e.g., a random-access memory (RAM), and a secondary memory 908, e.g., a hard disk drive and/or a removable storage drive. The secondary memory 908 may allow computer programs or other instructions to be loaded into the computer system 900. The computer system 900 may further include a communications interface 910 to allow software and data to be transferred between computer system 900 and external devices. The communication may be in the from electronic, electromagnetic, optical, or other signals capable of being handled by a communications interface. The communication may use a wire or a cable, fiber optics, a phone line, a cellular phone link, an RF link and other communications channels 912.

The terms "computer program medium" and "computer readable medium" are used to generally refer to tangible storage media such as removable storage units or a hard disk installed in a hard disk drive. These computer program products are means for providing software to the computer system 900. The computer programs, also referred to as computer control logic, are stored in main memory 906 and/or secondary memory 908. Computer programs may also be received via the communications interface 910. The computer program, when executed, enables the computer system 900 to implement the present invention. In particular, the computer program, when executed, enables processor 902 to implement the processes of the present invention, such as any of the methods described herein. Accordingly, such a computer program may represent a controller of the computer system 900. Where the disclosure is implemented using software, the software may be stored in a computer program product and loaded into computer system 900 using a removable storage drive, an interface, like communications interface 910.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A user device, UE, for a wireless communication system, the user device comprising:
   one or more antennas or an antenna array having a plurality of antenna elements,
   a signal processor; and
   a transceiver,
   wherein the user device is to use a transmission scheme on a radio resource,
   wherein the user device is to adapt the transmission scheme by selecting an additional radio resource on the basis of one or more parameters or by selecting an adapted transmission scheme,
   wherein the user device is to receive the one or more of parameters or the adapted transmission scheme from another device of the wireless communication system, and wherein the user device is to receive one or more of the following:
   a parameter referring to downlink control information, DCI, to set up one or more transmission schemes with k-repetitions separated in time,
   a configuration parameter referring to a random-access procedure,
   a DCI indicating frequency carriers or subbands,
   a broadcast system information block, SIB, indicating a frequency separation between frequency carriers or subbands,
   information of prior observed degradation events,
   information referring to a clustering of user devices.

2. The user device of claim 1, wherein the parameters further comprise a probability that the line of sight for the transmission is blocked.

3. The user device of claim 1, wherein the parameters further comprise coherence parameters of the radio channel.

4. The user device of claim 3, wherein the coherence parameters refer to one or more of time, space, frequency and/or polarization.

5. The user device of claim 3,
   wherein the user device is to adapt the transmission scheme such that radio resource and the additional radio resource are statistically uncorrelated, by selection of the additional radio resource such that the difference between the radio resource and the additional radio resource with regard to the determined parameters is larger than the coherence parameter, or
   wherein the user device is to adapt the transmission scheme such that radio resource and the additional radio resource are statistically correlated, by selection of the additional radio resource such that the difference between the radio resource and the additional radio resource with regard to the determined parameters is smaller than the coherence parameter.

6. The user device of claim 3, wherein the user device is to determine the coherence parameters by using reference symbols, RS.

7. A base station, BS, for a wireless communication system, using a transmission scheme on a radio resource, the base station comprising:
   one or more antennas or an antenna array having a plurality of antenna elements,
   a signal processor; and
   a transceiver, wherein the base station is to use an adapted transmission scheme, or one or more parameters of a radio channel associated with the radio resource for adapting the transmission scheme by selecting an additional radio resource on the basis of the one or more parameters, wherein the base station is to transmit the one or more of parameters or the adapted transmission scheme to a user device of the wireless communication system, and wherein the base station is to transmit one or more of the following:

a parameter referring to downlink control information, DCI, to set up one or more transmission schemes with k-repetitions separated in time, a configuration parameter referring to a random-access procedure, a DCI indicating frequency carriers or subbands, a broadcast system information block, SIB, indicating a frequency separation between frequency carriers or subbands, information of prior observed degradation events, information referring to a clustering of user devices.

8. The base station of claim 7, wherein the parameters further comprise a probability that the line of sight for the transmission is blocked.

9. The base station of claim 7, wherein the parameters further comprise coherence parameters of the radio channel.

10. The base station of claim 9, wherein the base station is to determine the one or more coherence parameters by using reference symbols, RS.

11. The base station of claim 10, wherein the reference symbols are comprised within the transmission scheme.

12. A method of operating a user device, UE, for a wireless communication system, using a transmission scheme on a radio resource, comprising adapting, by the user device, a transmission scheme by selecting an additional radio resource on the basis of one or more parameters or by selecting an adapted transmission scheme, receiving, by the user device, the one or more of parameters or the adapted transmission scheme from another device of the wireless communication system, wherein the user device receives one or more of the following:

a parameter referring to downlink control information, DCI, to set up one or more transmission schemes with k-repetitions separated in time, a configuration parameter referring to a random-access procedure, a field associated to the DCI comprising a frequency separation value, a broadcast system information block, SIB, comprising a value indicating a frequency separation between frequency carriers or subbands, information of prior observed degradation events, information referring to a clustering of user devices.

13. The method of claim 12, wherein the parameters further comprise a probability that the line of sight for the transmission is blocked.

14. The method of claim 12, wherein the parameters further comprise coherence parameters of the radio channel.

15. The method of claim 13, wherein the coherence parameters refer to one or more of time, space, frequency and/or polarization.

16. A method of operating a base station for a wireless communication system, using a transmission scheme on a radio resource, comprising determining, by the base station, an adapted transmission scheme, or one or more parameters of a radio channel associated with the radio resource for adapting the transmission scheme by selecting an additional radio resource on the basis of the determined one or more parameters, transmitting, by the base station, the one or more of parameters or the adapted transmission scheme to a user device of the wireless communication system, wherein the base station transmits one or more of the following:

a parameter referring to downlink control information, DCI, to set up one or more transmission schemes with k-repetitions separated in time, a configuration parameter referring to a random-access procedure, a DCI indicating frequency carriers or subbands, a broadcast system information block, SIB, indicating a frequency separation between frequency carriers or subbands, information of prior observed degradation events, information referring to a clustering of user devices.

* * * * *